United States Patent
Phillips et al.

(10) Patent No.: US 7,398,248 B2
(45) Date of Patent: Jul. 8, 2008

(54) SYSTEM AND METHOD FOR USING CARDS FOR SPONSORED PROGRAMS

(75) Inventors: Steve Phillips, Lansdowne, PA (US); Joe Rice, Point Pleasant Beach, NJ (US); Linda Mabrey, Oldsmar, FL (US); Colleen Donahue, Sea Girt, NJ (US); Laurie Feegel, St. Petersburg, FL (US); Jennifer Lee-Emmons, Clearwater, FL (US); John Bastone, Temple Terrace, FL (US); Katherine J. Perron, Neptune City, NJ (US)

(73) Assignee: Catalina Marketing Corporation, St. Petersburg, FL (US)

(*) Notice: Subject to any disclaimer, the term of this patent is extended or adjusted under 35 U.S.C. 154(b) by 1360 days.

(21) Appl. No.: 10/067,869

(22) Filed: Feb. 8, 2002

(65) Prior Publication Data
US 2003/0154163 A1 Aug. 14, 2003

(51) Int. Cl.
G06Q 30/00 (2006.01)
G07G 1/14 (2006.01)

(52) U.S. Cl. .............. 705/39; 705/14; 705/26; 902/25

(58) Field of Classification Search ........... 705/14, 705/16–18, 26–27, 35, 39–42, 44, 64–68, 705/75–79; 902/22, 24–29; 379/91.01; 707/1–6, 707/10, 100–104; 726/1–21
See application file for complete search history.

(56) References Cited

U.S. PATENT DOCUMENTS

| | | | |
|---|---|---|---|
| 5,511,114 A | 4/1996 | Stimson et al. | |
| 5,531,482 A | 7/1996 | Blank | |
| 5,590,038 A | 12/1996 | Pitroda et al. | |
| 5,892,827 A | 4/1999 | Beach et al. | |
| 5,915,007 A | 6/1999 | Klapka | |
| 5,945,653 A * | 8/1999 | Walker et al. | 235/380 |
| 5,974,399 A | 10/1999 | Giuliani et al. | |
| 5,984,180 A | 11/1999 | Albrecht | |
| 5,992,738 A | 11/1999 | Matsumoto et al. | |
| 6,026,370 A | 2/2000 | Jermyn | |
| 6,032,136 A | 2/2000 | Brake, Jr. et al. | |
| 6,068,183 A | 5/2000 | Freeman et al. | |
| 6,169,975 B1 | 1/2001 | White et al. | |
| 6,182,895 B1 | 2/2001 | Albrecht | |
| 6,282,516 B1 | 8/2001 | Giuliani | |
| 6,473,500 B1 * | 10/2002 | Risafi et al. | 379/144.01 |

(Continued)

OTHER PUBLICATIONS

Lucas, "What's in the Cards for Smart Cards?", Jun. 1995, Credit Card Management v8n3, pp. 64-71, ISSN: 0896-9329.*

(Continued)

Primary Examiner—Mary Cheung
(74) Attorney, Agent, or Firm—Neifeld IP Law, PC

(57) ABSTRACT

A method, system, and computer program product for implementing a marketing application using a store card as a Reward Card, Rebate Card, Pre-paid Script Program Card, Incentive Card, and/or Gift Card, as well as a Frequent Shopper Card. A card provided in association with an initial credit is also associated with an identification and account stored in a computer database memory, and the identification in the card enables the retailer to subsequently allow the consumer to use the card for additional computer based marketing, debit, and credit activity.

18 Claims, 7 Drawing Sheets

U.S. PATENT DOCUMENTS 7,006,983 B1 * 2/2006 Packes et al. ................. 705/14
2002/0022966 A1 * 2/2002 Horgan .......................... 705/1
2003/0028424 A1 * 2/2003 Kampff et al. ................ 705/14

OTHER PUBLICATIONS

PCT International Search Report PCT/US03/01074, Oct. 19, 2003.

* cited by examiner

2.02 — Card/Consumer Identification (CID) 987-654-321

2.04:

| Product | UPC | Store | Price | Redeem | Date | Time |
|---|---|---|---|---|---|---|
| Brand Z soda 6-Pack, 12Oz Cans | 123456789 | Retailer X | 2.99 | 2.99 | 12/04/00 | 1:23PM |
| Brand Z soda 6-Pack, 12Oz Cans | 123456789 | Retailer X | 2.99 | 0.00 | 12/12/00 | 8:12AM |
| Brand Z soda 6-Pack, 12Oz Cans | 123456789 | Wholesale Club W | 2.99 | 0.00 | 12/04/00 | 7:55AM |
| Brand Y Box, 24 Oz Macaroni and Cheese | 987654321 | Retailer X | 1.99 | 0.75 | 04/04/00 | 9:02PM |

| SKU (3.02) | UPC Code (3.04) | Store Chain (3.06) | Price (3.08) | Value Redeemed (3.10) | Date (3.12) |
|---|---|---|---|---|---|

| CID Number (4.02) | Brand Z Loyalty (4.04) | Heavy Snacker (4.06) | Healthy Household (4.08) |
|---|---|---|---|

SYSTEM AND METHOD FOR USING CARDS FOR SPONSORED PROGRAMS

BACKGROUND OF THE INVENTION

1. Field of the Invention

The present invention relates to problems in offering marketing programs to consumers. More particularly, the invention relates to retail marketing application systems and methods using an identification card.

2. Discussion of the Background

Pre-paid gift cards each typically are associated with a dollar value that can be used in a store identified by the card as credit towards a purchase in that store.

A frequent shopper card (FSC) typically stores a CID that represents a unique identification. The CID identification is some times associated in a computer database management system with a person or with members of the same postal or residence address.

The CID on a card is typically formed so that the CID can be machine read from the card, for example, by reading data stored magnetically in a magnetic strip or a visibly as a bar code. Machine reading typically occurs at a point-of-sale (POS) terminal. Examples of data that may be associated in a database management system with a CID in order to identify a consumer or household are credit card numbers, debit card numbers, social security card numbers, driver's license numbers, checking account numbers, street addresses, names, e-mail addresses, telephone numbers, frequent customer card numbers, Shopper Card Identifications (SCIDs).

Prior art script programs are programs wherein a third party organization, such as a school or charity, contracts with a retailer or grocer to sell paper certificates having a face value and that can be redeemed for their face value in the contracting retailer or grocer's participating stores. These certificates are also called "Funny Money." Funny money has a predefined dollar face value. Typically, a third party purchases the certificates for less than face value and sells them for their face value in order to make a profit. For example, a school may contract to pay retailer-X $8.00 to sell a consumer a $10.00 paper certificate, thus generating $2.00 for the school with every certificate sold. The consumer who purchased the paper certificate may then redeem the $10.00 dollar value of the paper certificate when making a purchase at the contracting store.

The present inventors recognized a drawback to prior art script programs. If a consumer makes a $2.00 purchase at the contracting retailer or grocer using a $10.00 certificate, the retailer or grocer would then be obliged to provide the consumer with change in the form of $8.00 in cash. The retailer or grocer potentially loses $8.00 in sales. This loss of sales is commonly referred to as "slippage".

Prior art rebate programs are programs where a consumer purchases an item with a rebate form included in with the item, the consumer fills out the information required on the rebate form, such as writing the consumer's name and address and the product's Universal Product Code (UPC), and then mails the rebate form and a proof of purchase of the item to the manufacturer of the item. The manufacturer then issues a check for the amount of the rebate and mails the check to the consumer. In certain countries product codes other than UPC codes are used. Use herein of UPC means any product coding convention.

The present inventors recognized drawback to a retailer in whose stores the consumer buys the products for which rebates are available. The rebate program provides no incentive for the consumer to return to the retailer's store. The present inventors recognized a drawback to consumers of rebate programs. The consumer must fill in multiple rebate forms and provide multiple proofs of purchase when complying with traditional rebate program requirements in to obtain rebates on multiple products.

A platform is defined as the hardware system and the system software used by a computer program. Examples of platforms are a client-server platform. The term server refers to any program that offers a service that can be reached over a network. A client refers to an executing program that sends a request to a server and waits for a response from the server. Servers are usually implemented as application level programs. Servers implemented as application programs can execute on any computing system that supports TCP/IP communication or the like. A server for a particular service may execute on a timesharing system along with other programs, or may execute on a personal computer. Multiple servers may offer the same service and may execute on the same machine or on multiple machines. Replica server copies on physically independent machines can be used to increase reliability or improve performance.

A database is a collection of data items that have certain associations with one another, and that may be shared and used by several different subsystems or other remote computer systems via an associated database management system, such as Microsoft Access or SQL Server software. The computer systems and code for accessing and using data stored in the databases define a database management system. A database may comprise arrays, records, and simple linked lists. The word "programmed" herein means that code is either software stored in recordable media or hard wired into semiconductor electronic components.

The design and implementation of various methods of database networking and Internet communications are well known, and are described for example in Comer, "Internetworking with TCP/IP Volume I: Principles, Protocols, and Architecture," $2^{nd}$ ed., Prentice-Hall, Inc. 1991; Comer and Stevens, "Internetworking with TCP/IP Volume II: Design, Implementation and Internals, "Prentice-Hall, Inc. 1991; Comer and Stevens, Internetworking with TCP/IP Client-Server Programming and Applications," Prentice-Hall, Inc. 1993; each of which is incorporated herein by reference.

SUMMARY OF THE INVENTION

One object of the invention is to provide a novel computer implemented system and method for preventing sales slippage.

Another object of the invention is to provide a novel computer implemented system and method for requiring the consumer to obtain rebates in the same store where the consumer obtained purchased goods giving rise to the rebates.

Another object of the invention is to provide a novel computer implemented system and method enabling script programs wherein the full value associated with the redemption is captured in the contracting retailer or grocer's participating stores.

Another object of the invention is to provide a novel computer implemented system and method for enabling rebate and script programs that do not require paper documents.

Another object of the invention is to provide a novel computer implemented system and method for enabling using a card and/or a CID for multiple purposes including as a gift card for providing a predefined dollar value, in a script program in place of a paper certificate, as a rebate card in place of a manufacturer's check, and as a frequent shopper card providing discounts purchase incentives to consumers.

A marketing program sponsor, or sponsor as used herein, means an entity that agrees to pay for crediting incentives of the marketing program when consumers satisfy conditions of the program necessary to obtaining the corresponding credit. A sponsor may be a manufacturer, an organization of manufacturers, a store, or an organization of stores, and any combination thereof.

These and other objects are achieved by providing novel computer network systems and methods for enabling sponsors including retailers, grocers, store chains, store associations, and manufacturers to provide a card to a consumer, to associate a CID with the card, to associate at least one, preferably at least two or three, and up to five accounts with the CID, and then using the card by recognizing the CID on the card to account for changes in the balances of the associated accounts for gifts, script values, rebates, discounts, and purchase incentives based upon consumer purchase transaction activity. In addition, the CID and card may also be associated and used for conventional banking credit and debit accounts.

A consumer's biometric reading may be used in place of an arbitrary CID. Biometric data includes retinal pattern, fingerprint, voice recognition, and facial recognition. Using biometric data avoids the need for a card in order to implement the present invention. If biometric data is used, the consumer's unique biometric data must be recorded to define a identification that can be used to identify the consumer in subsequent transactions. The biometric data can either be stored on a card or the place of transaction must be equipped with equipment to read the consumer's biometric data from the consumer per se.

The present invention provides novel computer network systems and methods for associating initial dollar amounts with one or more accounts associated with a CID associated with a card, and then subsequently changing the value in the accounts associated with the CID.

The store card of the present invention may serve as an FSC to track and record a consumer's purchase history and preferences, as described by commonly owned application Ser. No. 09/873,185 filed Jun. 5, 2001, the contents of which are incorporated herein by reference.

Card Structure

Card are typically a few centimeters on a side, about a millimeter thick, and include a at least a shell of hard plastic.

If the card is a smart card, it also includes computer memory and some processing ability. If the card is a smart card, or if the card includes read write memory, the initial dollar value and subsequent changes to accounts associated with the CID and the initial dollar amount may be stored in memory in the card.

If the card is not a smart card, the dollar values and accounts associated with the CID of the card may be stored in a memory or database in association with the CID in a digital computer system. The digital computer system may be a POS computer system associated with one or more retail stores or with a computer system capable of communicating with one or more POS computer systems associated with one or more retail stores.

In the case of smart cards, the accounts and their balances and associated conditions for debiting and crediting may be stored in either or both of the card's memory and in the POS computer system or a computer system in communication with the POS computer system.

Computer System Structure

The computer network system of the invention includes at least one database storing CIDs, and input/output means to receive the CID and communicate information to the consumer holding the card having that CID. The computer network system comprises at least a store computer system (including a POS computer system), and preferably also comprises a marketing computer system in communication with the store computer system. A database in the system stores conditions associated with a CID indicating when account balances associated with the CID should be debited or credited and the amount of the change. A computer in the computer network system determines when conditions associated with an account associated with a CID are satisfied, the amount of the change in the account balance, updates the database with the new account balance, and in certain cases provides instructions to a POS computer system or a POS terminal to modify a transaction in process with which the CID is associated.

Account Activation

Cards may need to be activated by initializing accounts associated with a CID associated with the card, and may additionally include the steps of generating and storing a CID in the card. Prior to activation, there may be no CID associated with the card, there may be no account associated with the CID of the card, or there may be data associated with the accounts for the CID of the card indicating that the card is not active. Inactive cards means cards that do not function to implement the sponsored programs disclosed herein for any one of these reasons. Card activation involves one or more of the following steps: associating a CID with the card, generating or initializing accounts associated with a CID of the card, and changing status data associated with a CID indicating that accounts associated with the CID are active in the sense that the accounts may participate in sponsored programs.

Card activation may be performed individually using an individual card activation mode associate with one CID. Individual card activation is more suitable for in-store distribution of cards. Cards are individually activated by transmitting at least data indicating a CID associated with the card to a central database. Preferably, activation also requires transmission of one or more predetermined activation codes. The predetermined activation codes may be store employee codes, a store department codes, store codes, chain codes, association codes, or manufacturer codes, wherein each code uniquely identifies the corresponding entity.

Card activation may be performed for a group of cards by using a batch card activation mode identifying a plurality of CIDs. This type of activation, a file containing CIDs is read by a computer system and the computer system indicates in a database containing accounts for those CIDs that the accounts are active. Batch card activation is more suitable for mass distribution of cards, such as by a direct mailing of a card, one to each one of a large numbers of consumers. Since multiple accounts may be associated with a single card, activation of different accounts associated with the card may occur at different times.

Account Modification

Modification to accounts associated with a CID may be contingent upon a number of different types of conditions. These conditions may be imposed by the sponsor of the marketing program, conditions imposed by a retailer or manufacturer in addition to those imposed by the sponsor, and conditions imposed by a marketing company in addition to those imposed by the sponsor. These conditions include: purchase of particular items or services; purchase of items or services in certain categories; purchase in certain time periods; purchase in certain stores, associations of stores, locations, and chains of stores; currency (e.g., dollar amount) of associated purchase transaction or cumulative dollar amount of associated purchase transactions in a specified time period or for all recorded associated transactions; receipt by rebate fulfillment service of rebate forms with complete information, of receipt of proof of purchase, and receipt of secondary identification, such as driver's license or credit card number. Amounts of account changes or inventive offers may depend upon prior product purchase history associated with the CID, such as frequent or infrequent purchases of a product, of products in a category, consistent purchase for one brand over another, or inconsistent purchase of one brand over another brand.

Sponsored programs

In one computer implemented sponsored program of the invention, an account having a non-zero initial balance is established, activated, and associated with a CID. The computer system storing the account stores specifications of stores at which the value of the account associated with the CID is applicable to partially offset costs of a purchase transaction associated with the CID. A consumer receives a card having the CID. The consumer purchases in a specified store. The CID is read by the POS terminal in association with the purchase transaction. The POS system offsets the cost for the purchases by the amount of the initial non-zero balance in the account. Alternatively, the POS system provides cash back to the consumer to the extent the initial account balance exceeds the charges for the purchase transaction. This marketing program is referred to herein as an Initial Distribution Reward program. If the consumer already has a suitable card, the account's CID may be associated with the consumer's pre-existing card by entering the CID associated with the aforementioned non-zero initial balance, and also entering the CID of the consumer's card. One or more security codes, such as a store clerk's ID code or the like could be entered as part of the same transaction.

In another computer implemented sponsored program of the invention, a third party sells cards that each have a predetermined face value, such as $10.00, $25.00, $50.00 or $100.00, to consumers for face value. All cards in the possession of the third party may be activated prior to sale, and any cards not sold by the third party may be deactivated if not sold. Alternatively, only those cards that are sold are activated. Either upon activation of each card, or after a time set for deactivation, a computer system accounting for the third party's sale of cards credits an account associated with the third party. The total credit is based upon the number of cards sold by the third party. The consumer typically pays the face value for the card. The value associated with the card may be used to offset the cost of purchase transactions in specified stores. This type of method is referred to herein as a Script program. Preferably, the terms of the Script program do not provide for rebating money to the consumer if the consumer's purchase transaction is less than the currency amount associated with the Script program account of the consumer's card. If the consumer has a suitable card, the face value may be associated with the consumer's pre-existing card by entering the CID of a predefined account having a value associated with it, and also entering the CID of the consumer's card, and typically the consumer would at that time pay the third party the face value. One or more security codes, such as a store clerk's ID code or the like could be entered as part of the same transaction.

In another computer implemented sponsored program of the invention, a rebate account associated with the CID of the card associated with a purchase transaction is credited by the amount of rebate credit to which purchases in the transaction are entitled. The consumer may then redeem the balance in the rebate account associated with their card by subsequently presenting the card in a store participating in the rebate program. The store's computer system determines the balance amount in the rebate account. The store provides to the consumer the amount associated with the CID. This type of method is referred to herein as the RebateMax program. Typically, it is the store in which the items having the rebate offers are purchased that will want to participate in the program by paying the consumer the rebate credit amount.

The consumer's rebate account associated with the consumer's card is typically credited by a manufacturer when the manufacturer receives from the consumer proofs of purchase and properly completed rebate forms. The manufacturer's computer system sends appropriate information to the computer system managing the database storing the consumer's rebate account. When the consumer presents his card at a transaction terminal, such as a POS terminal or Kiosk, in a participating store, the store's POS system queries the consumer's rebate account and credits the consumer's concurrent transaction (typically at a POS terminal) or provides the consumer a store chit or cash (typically at a Kiosk in the store). The POS system communicates the change in the consumer's rebate account to the computer system managing the consumer's rebate account, and the consumer's rebate account is appropriately updated to reflect change in balance.

Alternatively, the store's proof of purchase document is generated during a customer's transaction at the POS to contain in computer readable form one or more of the following: identifications of products contained in the purchase (e.g. UPC codes), quantities of each product purchased, consumer's CID), a central rebate clearinghouse address, and individual manufacturer rebate clearinghouse addresses. The purchase document may also contain instructions and information in human readable form. The consumer mails the proof of purchase document to a clearinghouse, the clearinghouse automatically reads information on the proof of purchase document, and credits the consumer's rebate account if appropriate.

In one embodiment, either the store's POS system or a computer in communication with the store's POS system stores data indicating which products have associated rebates, determines which products in the consumer's order are entitled to rebates and provides that information in human readable form to the consumer at the POS during the transaction.

In an alternative to this embodiment, the POS system identifies the product items in a consumer's orders that are entitled to rebates, the sponsors for the rebates for the product items in the consumer's order, credits the consumer's rebate account, and debits accounts of the various rebate sponsors. The rebate sponsors pay the retailer the amount their accounts are debited. The retailer provides the rebate amount to the consumer, preferably on a subsequent transaction in the retailer's store, and debits the consumer's rebate account. The retailer may impose additional conditions on providing the rebate to the consumer, such as a minimum time interval between when the consumer purchases items providing a rebate balance in the consumer's account and when the consumer's account balance is credited, the requirement to purchase, purchase more than a specified dollar amount, or more than the rebate dollar amount. The retailer may also debit the accounts of the sponsors an additional charge for this service. A central computer associated with a sale organization may manage the databases and charge either or both the owner of the store or stores and the sponsor or sponsors a service fee for managing the rebate programs.

In another computer implemented sponsored program of the invention, the CID) of the card has associated with it a dollar value, the consumer receives the card and presents it in a participating store, typically to a clerk operating at a POS terminal. The store then provides the consumer currency in the amount of the dollar value associated with the card. This method is referred to herein as a Forced Validation Gift program. The store's POS system transmits the information on the cash transaction to the computer system managing the database storing the CID for the card, and that computer updates the database record for that account for the CID. In this method, preferably the customer is enabled to use the card as an FSC card in the store after the initial Gift. To that end, the store clerk or a service person in the store may receive and enter into a computer information about the consumer holding the card having the CID, including demographics, product preferences, and name and contact (email, telephone, postal address) information. A computer system may store that information in association with the CID of the card for use in marketing studies and programs, and to target market to that consumer.

In FSC programs, stores or manufacturers determine purchase incentives to provide to consumers using FSCs to stimulate purchase or loyalty to a store. In these programs, the sponsor provides discounts on current purchases some of which may be based upon fulfilling specified conditions, and identifies conditions for discounts on future purchases to the consumers. Consumers meeting conditions receive discounts. Discounts may be based upon purchasing specified products in specified stores and providing the CID or cards in association with the purchase.

Each of the marketing programs mentioned above includes a CID, and that CID can be used for tracking and maintaining records of consumer purchases at stores participating in a card program, can be used as an FSC in addition to accounting for initial account balances. When used as an FSC, the CID associated with the card is used by a POS computer system to track and maintain accounting records of the consumer's product purchases. If a consumer already has a CID and card when entitled to a Forced Validation Gift, Script, or Initial Distribution Reward, the CID for that entitlement can be associated in a computer database with the CID of the consumer's preexisting card thereby enabling the consumer to use the preexisting card.

Further, one or more computer systems may simultaneously store one or more distinct accounts associated with the same CID, and the card having that CID may simultaneously be used to implement each one of the Initial Distribution Reward, Script, RebateMax, Forced Validation Gift and FSC programs. For example, a retail or grocery store may use the card to implement its own Initial Distribution Reward and Forced Validation Gift programs, and then follow on FSC programs, a retailer in conjunction with a third party may use the same card or at least the same CID to implement a Script program, and a manufacturer in conjunction with many retailers may use the same card or at least same CID to implement a RebateMax program. Further, retailers can use the same card to provide conventional debit and credit card services. Finally, if biometrics are used instead of cards, the same unique biometric data may associated with the multiple accounts for the same person for each of these programs instead of a card's CID. Finally, biometric data for people in the same household may be associated with one another so that all transactions for that group of people affect the same account or set of accounts.

One major advantage of the systems and methods of the invention is that they provide a sponsor means to enable the transfer of a dollar value to an account associated with a consumer. The systems and methods of the invention enable sponsor control of where, when, and how a dollar value associated with a card may provided to a consumer.

Another major advantage of the systems and methods of the invention is that they provide means to associate dollar values and conditions with cards. A card utilized by the invention may be registered by a consumer or consumer household for use as an FSC consumer purchase history tracking and accounting vehicle. The system and method of the invention enables a program sponsor and store participants to dynamically maintain consumer purchase history data, consumer profile data, and/or consumer demographic data.

BRIEF DESCRIPTION OF THE DRAWINGS

A more complete appreciation of the systems, methods, and advantages of the invention is provided by the following detailed descriptions when considered in connection with the accompanying drawings, wherein:

FIG. 2 is an illustration of a data structure for storing purchase history and/or profile data of a particular consumer;

FIG. 3 is an illustration of a data record storing purchase information associated with a single transaction;

FIG. 4 is an illustration of parts of a data record of a qualifying consumer profile;

DETAILED DESCRIPTION OF THE PREFERRED EMBODIMENTS OF THE INVENTION

Figure 1A:
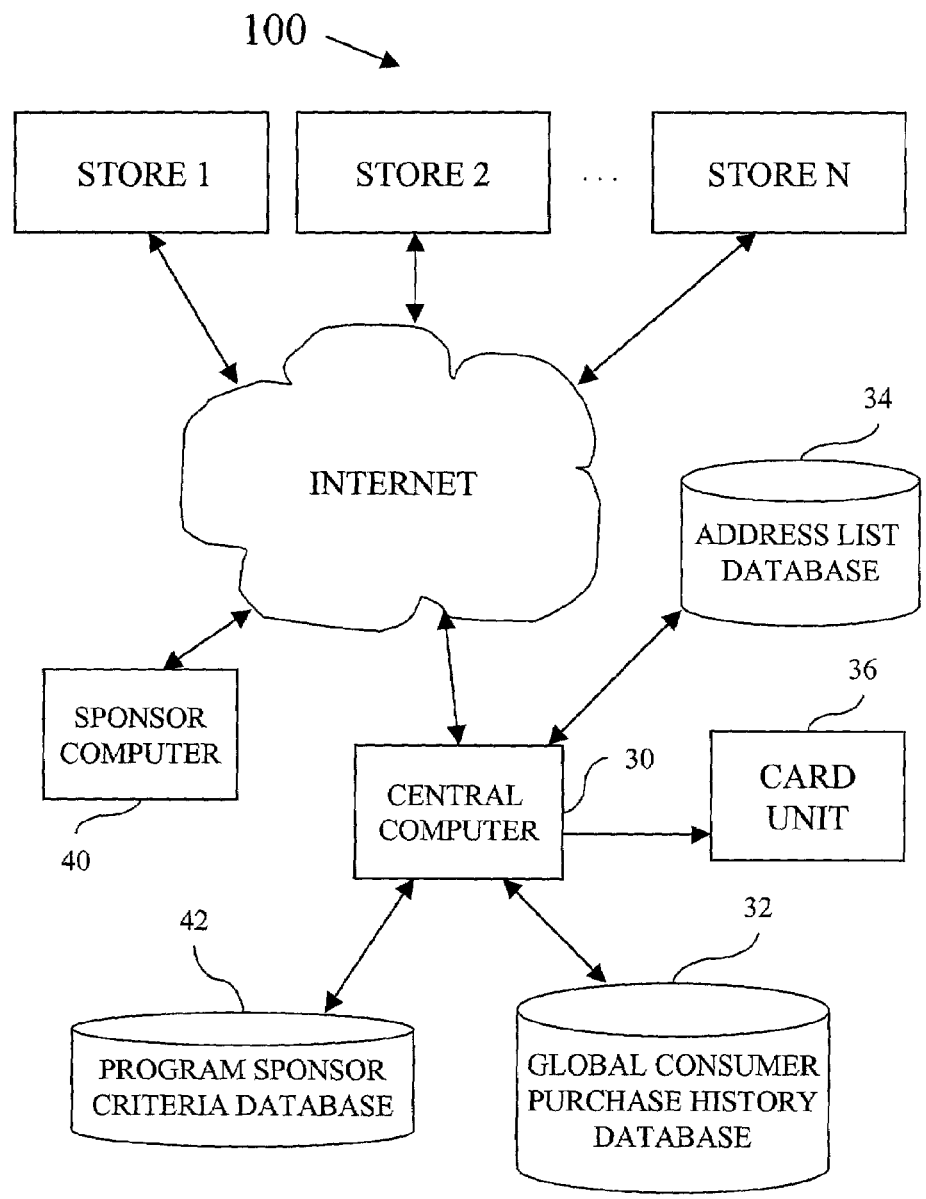
FIGS. 1A and 1B are schematics of a preferred embodiment of a novel computer system.

In the references to the drawings below, like reference numerals refer to the same or corresponding elements.

System Components

Figure 1B:
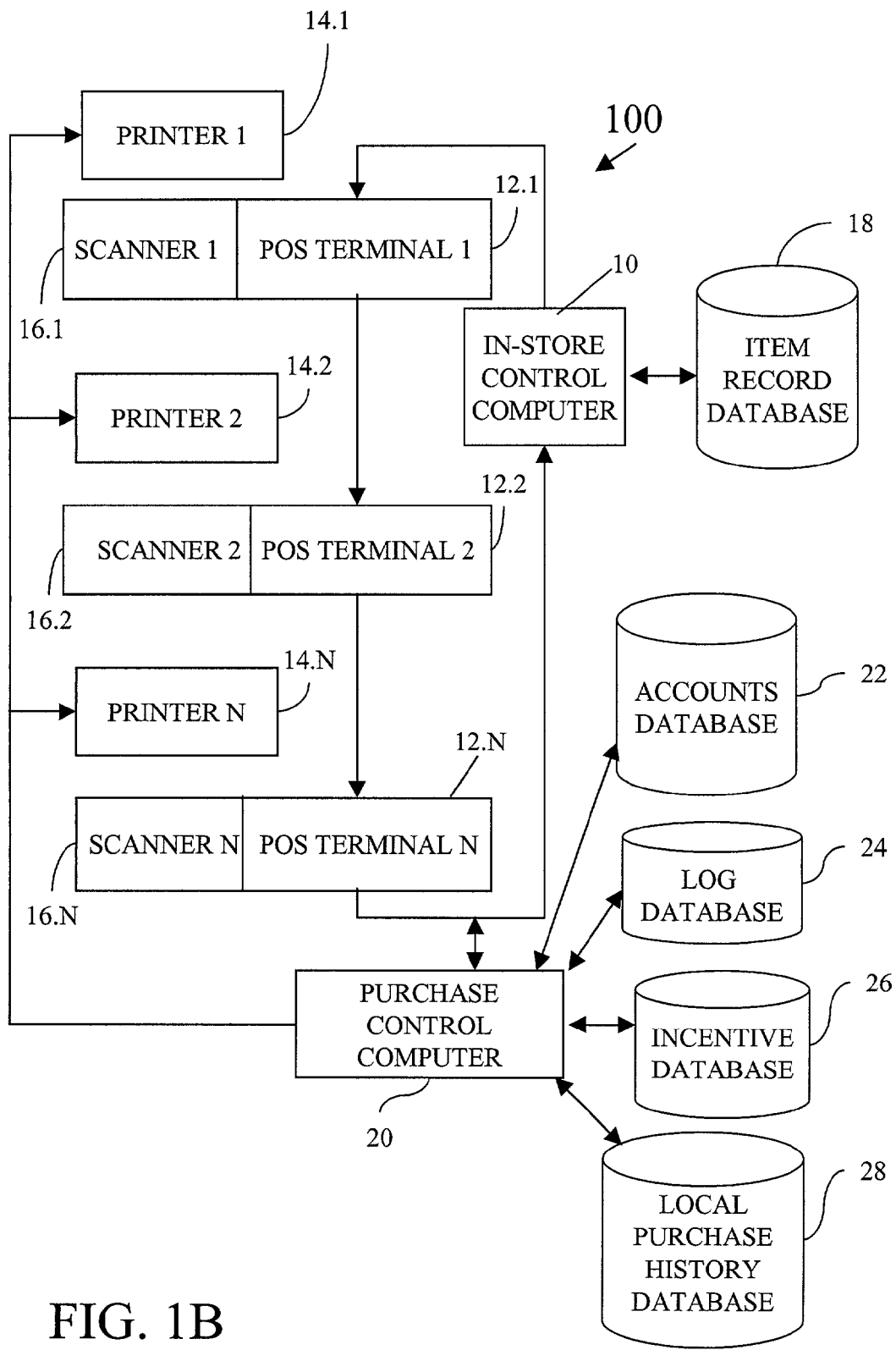
Figure 5:
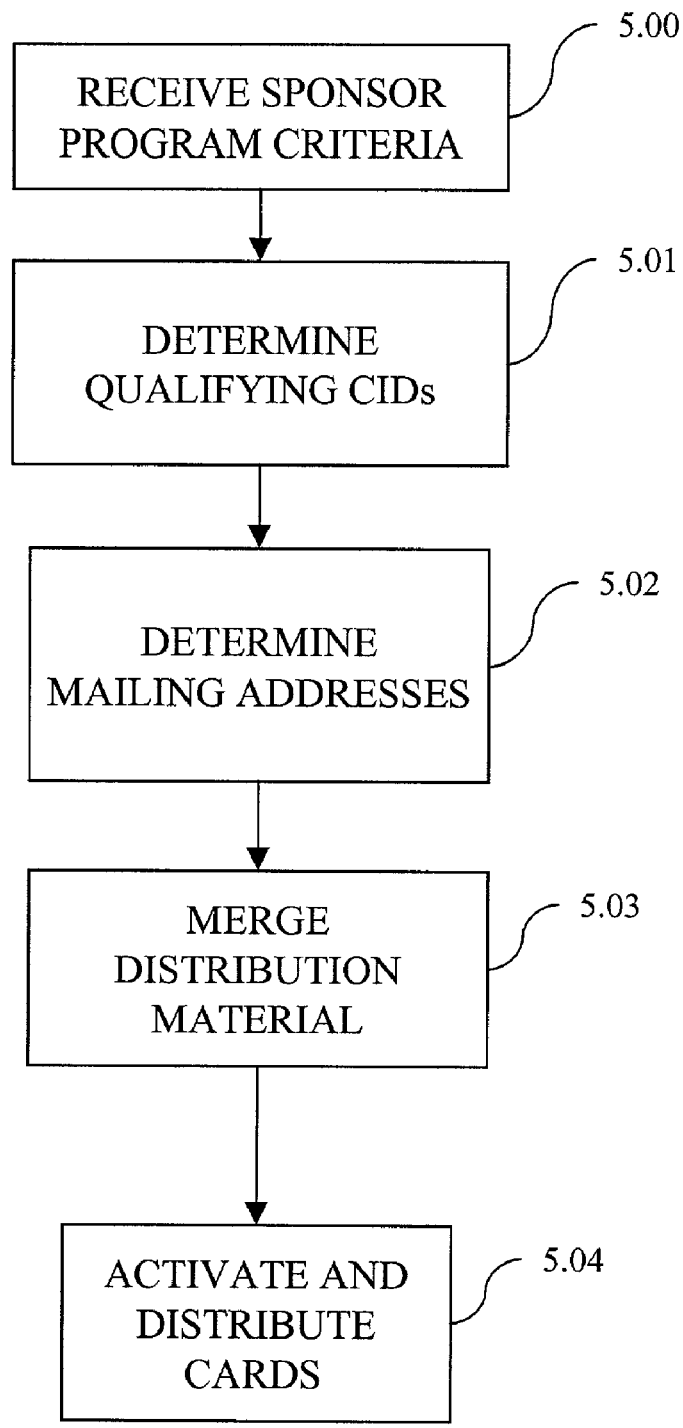
FIG. 5 is a flowchart showing some of the pertinent pre-program processing steps that are performed according to the present invention.

Arrow heads in FIGS. 1A and 1B indicate the directions of data flow between devices connected by arrow lines.

FIG. 1A shows network computer system 1 includes at least one store computer system 100, sponsor computer 40, central computer 30, card generation unit 36, program criterial database 42, global purchase history database 32, and consumer address list database 34. Databases 32, 34, 42 are preferably associated with the central computer system 30. All computers of the system are preferably networked, preferably via the Internet 2.

The store computer system 100 preferably includes: an in-store or POS control computer 10; purchase control computer 20; plurality of point-of-sale (POS) terminals 12.1, 12.2, . . . , 12.N; plurality of POS printers 14.1, 14.2, . . . , 14.N; plurality of POS scanners 16.1, 16.2, . . . , 16.N; item record database 18; accounts database 22; dollar log file database 24; incentive/dollar matrix file database 26; local consumer purchase file database 28, and purchase control computer 20.

Computer 10 functions to account for inventory and purchase transactions.

Purchase control computer 20 is preferably includes a separate processor from computer 10 and is connected to the in-store LAN or other local communication network. The functions performed by the purchase control computer 20 may alternatively be incorporated with the functions of the in-store control computer 10.

Purchase control computer 20 includes means to access and analyze transaction data and control signals transmitted from any of the POS terminals 12 to the in-store control computer 10. Computer 20 functions to analyze sales data, generate and account for debits and credits to rewards, rebates, gifts, and incentives or dollar values and associated rules associated with the store 100's consumers accounts.

Each of the aforementioned computers may include a computer housing which contains a CPU, memory (e.g. DRAM, ROM, EPROM, EEPROM, SRAM, SDRAM, and Flash RAM), special purpose logic devices (e.g. ASICs), configurable logic devices (e.g., GAL and reprogrammable FPGA), plural input devices, (e.g., a keyboard and a mouse), display cards for controlling a monitor, disk drives and controllers, removable media devices (e.g., compact disc, tape, and removable magneto-optical media, electrically connected using a device bus (e.g., a SCSI bus, and Enhanced IDE bus, or an Ultra DMA bus), and network interface hardware.

Each of the aforementioned computers may be a single computer or a plurality of associated computers. Software for controlling the hardware of an in-store computer 10, a purchase control computer 20, and a host computer 30 for enabling the computers to interact with a human user may be stored on any one or on a combination of computer readable media. Such software may include, but is not limited to, device drivers, operating systems, network protocals, and user applications. The direct line network connection or WAN connection through which the computers may include public telephone, cable system, and Internet connections.

The global purchase history database 32 may store and maintain sponsored program criteria for a plurality of sponsored programs.

The global purchase history database 32 may also store consumer records from a plurality of stores. Consumer records include a CID, and may include consumer profile data, such as consumer address data, income bracket, age, residence location or area such as zip code, sex, height, weight, and indicated preferences. Consumer records may include consumer purchase history data, such as data indicating the dollar amounts of each consumer purchase, identification of any items purchased, the dates on which items were each purchased, the frequency of purchases, and various derivatives of such data. Derivatives of consumer purchase history data may include frequency of purchase of specific items, recency of a specific purchase, and relative frequencies of item purchases, such as the types and brands of items purchased compared to one another.

The global consumer purchase history database 32 may additionally store post promotional sponsored dollar value program offer sales analysis data. This is data derived from sales and time of sales indicating the impact of the sponsored program on sales of sponsored products.

The global consumer purchase history database 32 may additionally store retail or grocery store profile data for retail and grocery stores, such as consumer demographics data associated with the locations of stores or markets associated with stores.

The global consumer history database 32 may additionally store item UPC codes individually, grouped by category, and/or grouped according to a program sponsor's general sales objectives.

Global program criterial database 42 stores sponsored program terms and conditions and any additional terms and conditions imposed by non sponsor product manufactures and retailers involved in a sponsored program. However, global program criteria database 42, dollar log file database 24, and incentive database 26 may each store data defining some or all of the terms and conditions of a sponsored program.

Terms and conditions of a sponsored dollar value offer program include qualification criteria data. Qualification criteria data define criteria a record associated with a CID must satisfy in order for the consumer associated with that CID to be offered an incentive or be offered a card. Qualification criteria may include (1) consumer profile criteria, (2) timing criteria, (3) purchase history criteria, and (4) purchase item criteria. Consumer profile criteria includes demographics and spending habits criteria, including purchase history criteria.

Timing criteria defines date ranges for purchases and dollar values of purchases.

Purchase history criteria number and frequency of purchases by a consumer, including by product category and product item.

Purchase item criteria define product items in the customer's current purchase.

Each local consumer purchase history database 28 may store records containing a CID, consumer purchase history data, and consumer demographic data.

Accounts database 22 stores account data relating to CIDs of store cards, conditions placed upon those accounts, and updates that data when store 100's consumers accounts should be debited or credited. However, an accounts database associated with central computer 30 could perform the same function for store 100, and for all other stores participating in sponsored programs.

Log database 24 stores the number and amount of redemptions, awards, and incentives in associated with a CID of a card.

Incentive database 26 defines terms and conditions of an incentive or presently in effect in the store 100.

Item record database 18 includes a record for each item or service offered for sale by the store, e.g., the store inventory. Each item or service record includes the item price and a UPC.

The store cards embodied by the present invention may include indica such as a bar coded CID; typographic personalized information such as name, CID, or member level, a photograph, an electronic image file containing photographic data. The cards are typically about 5 by 10 centimeters by about 1 millimeter in dimensions, and preferably include a hard plastic frame.

FIG. 2 shows a representation of an exemplary data structure of a consumer purchase history record 2.00 for storing consumer purchase history data for a particular CID corresponding to a particular card or consumer. The representation indicates that all data contained in a consumer purchase history record 2.00 is associated with the CID 987-654-321 in box 2.02. Element 2.03 identifies field headings. Data in each row of table 2.04 below the CID is associated with one another indicating that the data in each row relates to the sale of one or more units of one product. For example, the data in the first row indicates a purchase of a 6-Pack of 12 ounce cans of Brand Z soda, which has Universal Product Code 123456789, by Store X for $2.99 on Dec. 4, 2000. CIDs for the same consumer in the global consumer purchase history database 32 and local consumer purchase history database 28 may be different from one another but linked to one another. The table 2.00 may include one or more linked lists, such as an array of purchase records.

FIG. 3 shows part of an exemplary purchase record 3.00 which may be implemented as part of a consumer purchase history record database 28. All elements of a data record are associated with one another. The purchase record 3.00 includes a data field 3.02 for indicating an item's shelf keeping unit (SKU). Each SKU identifies a distinct item, such as a "one 2 liter bottle of Brand Z soda." The purchase record 3.00 also includes a data field 3.04 for indicating the universal product code (UPC). Each UPC is generally implemented as a bar code on an item. Preferably, the purchase record 3.00 includes a data field 3.06 for storing the purchase location, a data field 3.08 for storing the price per SKU, a data field 3.10 for storing any redeemed dollar value used for the purchase, and a data field 3.12 for storing purchase date.

FIG. 4 shows part of an exemplary consumer profile record 4.00 relating to consumer purchase history behavior. The consumer profile record 4.00 may be a data structure that includes a data field 4.02 for identifying the CID. The consumer profile record 4.00 may include additional data fields for storing consumer purchase history classification data with regard to one or more purchase behavior criteria. The exemplary consumer profile record 4.00 includes three data fields 4.04, 4.06, and 4.08, for three consumer purchase behavior classifications, such as brand loyalty (Brand Z loyalty), snaking criteria (heavy Snacker), and health criteria (Healthy Household), respectively. The purchase behavior classification may be based on meeting selected purchase criteria determined from consumer purchase history data. For examnple, "Brand Z loyalty"—means the consumer has purchased Brand Z at least three times during the last twelve week period; "Heavy Snacker"—means the consumer has purchased at least 30 units of a food item categorized as a snack food type item within the last six month period; and "Healthy Household"—means the consumer has purchased at least 30 units of an item categorized as a nutritional supplement type food item within the last six months.

System Functionality

In-store control computer 10 reads product information from item record database 18 and records in local purchase history database 28 purchase data for consumers that present their store cards or CIDs in any form at checkout. Purchase control computer 20 may periodically communicate the data captured by local consumer purchase history database 28 to central computer 30. Central computer 30 may automatically or periodically copy this data into the global consumer history database 32.

Referring to FIG. 1B, the in-store control computer 10 communicates with purchase control computer 20, POS terminals 12, printer units 14.1, 14.2, . . . , 14.N, and item record database 18 file database 18 to provide price and totals to POS terminals 12.

Printers 16, or display units or data links at POS terminals 12 may be used to provide a consumer with indication of current dollar values of accounts associated with a CID of a card, and any newly generated or downloaded reward, rebate, incentive, or gift dollar value, etc. The POS terminals 12 typically connects to the in-store control computer 10 via a local area network (LAN) or other suitable communication link. The in-store control computer 10 may access various databases in addition to item record database 18.

A consumer redeemable dollar value downloaded or associated with a store card may be sponsored by a retailer, grocer, manufacturer, store chain, mall, employer, school, charity and/or a combination of multiple sponsors making-up a sponsoring party. The dollar value of a store card downloaded or associated with a consumer redeemable dollar value may be predefined by a sponsoring party. The decision to provide the store card to a consumer may be based upon consumer purchase history data, consumer profile data, and incentive specifications. Qualification criteria provides a sponsoring party means to direct and/or limit consumer redemption of store card downloaded or associated dollar values based upon only those items, or categories of items for which the sponsor intended to provide a purchase incentive.

A basic function of a store card according to the present invention is to provide a CID. CID data may be input at a POS terminal into purchase data control computer 20 or in-store computer 10 via a local in-store communication loop, a LAN, or the like. CID records may be accessed and dynamically updated by purchase control computer 20 and/or in-store control computer 10 at the time of purchase.

Purchase control computer 20 and/or in-store control computer 10 perform various functions. These functions may include: tracking and recording consumer purchase history data, consumer dollar value redemption data, and/or purchase data; and recognizing and validating that current consumer purchase data, consumer purchase history data, consumer profile data, and/or consumer demographics data meets or qualifies for consumer purchase dollar value redemption.

Qualification criteria may be applied to a CID and transaction data during a purchase transaction at a POS terminal, during a purchase transaction over the Internet, or simply upon presentation of a CID at a POS terminal, at a Kiosk, or over the Internet. The program sponsor may specify qualification criteria including consumer profile and purchase history criteria, purchase by product, retail store, location and retail store chain or association.

Embodiments of the present invention function using a store card including a memory storage mechanism which stores CID associated account database file records, as noted above, within a card's memory storage mechanism. Purchase control computer 20 or in-store control computer 10 may retrieve at-least some of the above-noted CID associated account database record fields directly from the card without the need to access another database at the time of purchase. This data may be used for recognition and validation that items being purchased qualify for redemption of a currently available dollar value at a POS terminal at the time of purchase. At the time of purchase/dollar value redemption, the purchase control computer 20 and/or in-store control computer 10 may dynamically update any appropriate CID associated account record fields. These include those records fields stored within the store card's memory, and any other appropriate database record files.

Central computer 30 may periodically and/or upon request transmit to computers 10, 20, qualification criteria data. Computers 10, 20 may perform validation and maintenance of CID accounts when they have access to the qualification criteria. Dollar value redemption approval may occur at a time of purchase, and redemption amounts may be associated by the central computer 30 with a particular account and a particular sponsored program.

Sponsor computer 40 may be programmed to transmit marketing program criteria to central computer 30.

Central computer 30 may process information stored in the global consumer purchase history database 32, use card unit 36 to generate new cards, and control card activation. Newly generated batches of cards may be redistributed to previously registered consumers along with printed human readable indications of account balances, incentives, conditions, and expiration dates.

Each purchase control computer 20 and in-store control computer 10 may transmit data to the central computer 30. This data preferably includes CID records including product purchase data, and also redemption data and credits and debits associated with marketing programs.

Embodiments of Methods of Using the System of the Invention

The central computer 30 or purchase control computer 20 analyzes consumer profile and consumer product purchase history data to determine which CIDs meet qualification criteria, and therefore which consumers qualify to receive cards, rewards, rebates, incentives or gifts. In addition, gift cards can be purchased thereby mooting this qualification step. The computer may maintain accounts associated with CID, including when cards, rewards, rebates, incentives, gifts, and credit is provided and in what amount and under what conditions. Central computer 30 preferably downloads the details of reward, rebate, gift, or incentive dollar value deals to individual stores. In addition, central computer 30 preferably uploads data from each store, including the numbers of reward, rebate, gift, or dollar value deals generated, total credit redeemed, and all information on each CID related account.

In one embodiment, central computer 30 uses the data in global consumer purchase database 32 and the consumer address list database 34 to identify consumers who meet qualification criteria and to instruct on distributing cards to qualified consumers by direct mail or other suitable delivery means. Alternatively purchase control computer 20 can perform this function. For example, the central computer system 30 may produce two output files in support of a targeted mailing to qualified consumers. The first file is an offer definition file which, for each offer code number, contains the text description of the offer along with other information. The second file is a mailing list file that contains the name, address and other mailing information about each recipient along with a list of the offer codes identifying offers for transmission to the recipient. The offer codes in the mailing list file correspond to offers defined in the offer definition file. The offer definition file contains information required to print or display an offer. It preferably includes the following fields: field name, count of the number of records in the file, data and time file was created. Records in this file contain data indicating a unique number identifying the offer and the offer's purchase conditions, preferably as follows:b 1=cents off UPC list, 2=% off UPC list, 3=cents off everything in a department, 4=% off everything in a department, 5=any product in UPC list free, value of the offer in pennies, date and time when the offer becomes effective, date and time when the offer ends (MMDDYYhhmm), short description of the offer, and UPC number to bar code on the dollar value or offer.

The mailing list file contains data preferably indicating the name, address, letter type and offers to be distributed to each consumer or household. Its header record preferably contains data indicating count of the number of records in this file, date and time this file was created. Each subsequent record preferably contains data indicating identifying name of this mailing, name of the letter shop receiving file, name of the mail piece to be received by consumer or household, primary card number consumer or household uses for identification, recipient's title (Mrs., Mr., etc), recipient's last name, recipient's first name, recipient's middle initial, name suffix (Sr, Jr, etc), street name, secondary address (apt #, etc), city, state, zip+4, postal carrier route code, delivery point bar code, offer 1 (zero for no offer), offer 2 (zero for no offer), . . . , offer N (zero for no offer), USPS ACS keyline, total value of offers on this record. Central computer 30 may perform list cleaning on the consumer data in the global consumer purchase history database 32, for example by performing validation checks on consumer address data and email address data.

In general, a promotional store card distribution mailing will be directed to customers of multiple retail and/or grocery store chains. The retail and/or grocery chains are identifiable from the purchase transaction data stored within the global consumer purchase history database 32 and the consumer distribution list can be stored easily by individual retail or grocery stores. The retailer or grocer then has the benefit of local storage of this information to provide follow-up distributions or supplemental promotional dollar value download notification to take advantage of the initial distribution.

Once cards have been generated and consumers selected to receive them via mail, other distribution materials may be merged with cards, including descriptive text, photographic materials combined into an attractive presentation format that highlights promoted the sponsored programs. Card distribution may be by hand delivery, a POS terminal, shipping to stores, or mailing to residence addresses.

Purchase control computer 20 may receive consumer selection criteria from central computer 30 and apply the selection criteria to its CID database in order to determine customer accounts to provide a credit reward, rebate, or incentive. Purchase control computer 20 may notify a customer of these credits and also account for redemptions when a customer's CID is detected at a POS terminal in the store. A consumer may be notified at a POS terminal via a display or printed message.

During a purchase transaction, a product purchase related award may be identified by evaluating the value of a trigger flag field in item record database 18. The value of that trigger field may identify an item as being subject to a purchase incentive deal, which deal is preferably defined in incentive database 26. When a triggering item is encountered in the processing of a consumer's order, the purchase control computer 20 retrieves the terms of the discount deal and informs the consumer, such as via a visual display, audible message, or printed coupon.

In addition, when a CID is identified in association with a purchase transaction, preferably accounts database 22 is accessed to determine credit or rebates associated with accounts for that CID. During the purchase transaction, any dollar value currently unconditionally available as credit associated with the CID or the customer involved in the purchase transaction is then redeemed by crediting the charges for the purchase transaction. In addition, conditional credits or redemptions are compared against the customer's current purchases to determine whether conditions are met for additional credits. Conditional credit would exist for previously provided purchase incentives, such as paper or paperless product coupons. If after subtracting the price of any item purchased from the dollar value associated with the store card, credit still exists, the credit remains in the account, subject to future redemption. The consumer's purchase transaction receipt preferably identifies the credit or redemption.

Figure 6:
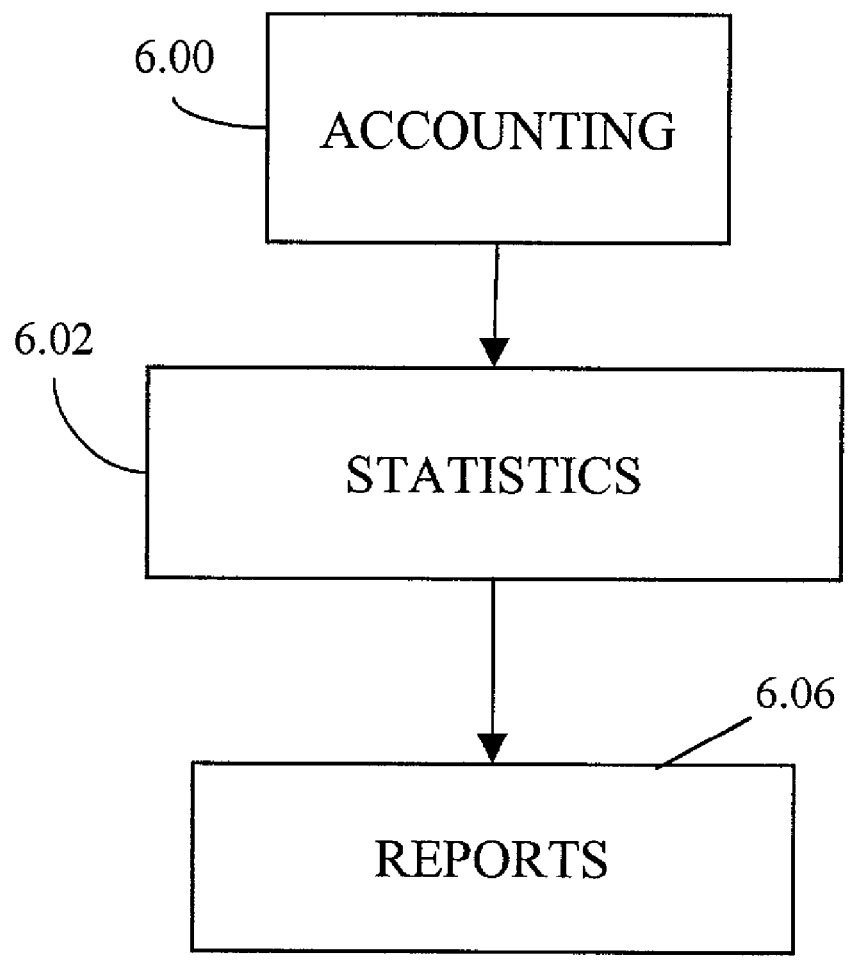
FIG. 6 is a flowchart showing some of the pertinent post-program processing steps that are performed according to the present invention.

FIG. 6 is a flowchart showing an example of processing steps for accounting for sponsored program charges and reporting on the effectiveness of those programs. These steps preferably are performed by central computer 30. Central computer 30 consolidates transaction from all stores for either a given program or all programs for a given manufacturer. Central computer 30 debits the manufacturer's account for the credits to consumer's that participated in the manufacturer's sponsored program or programs. Likewise, central computer 30 credits the accounts of each retailer organization. In addition, central computer 30 determines certain statistical values. These statistical values include the fraction of cards initially distributed in each sponsored program that are subsequently actually used, actually used as FSCs, and relationships between the subsequent use rates and value of the initial account balance, and demographics of the consumers initially receiving the cards. Central computer 30 is then generates reports based upon the statistical values that may be shared or sold to various retailers and manufacturers. In addition, the values in those reports may be used contractually to determine a fee payable to the marketing organization operating central computer 30.

Figure 7:
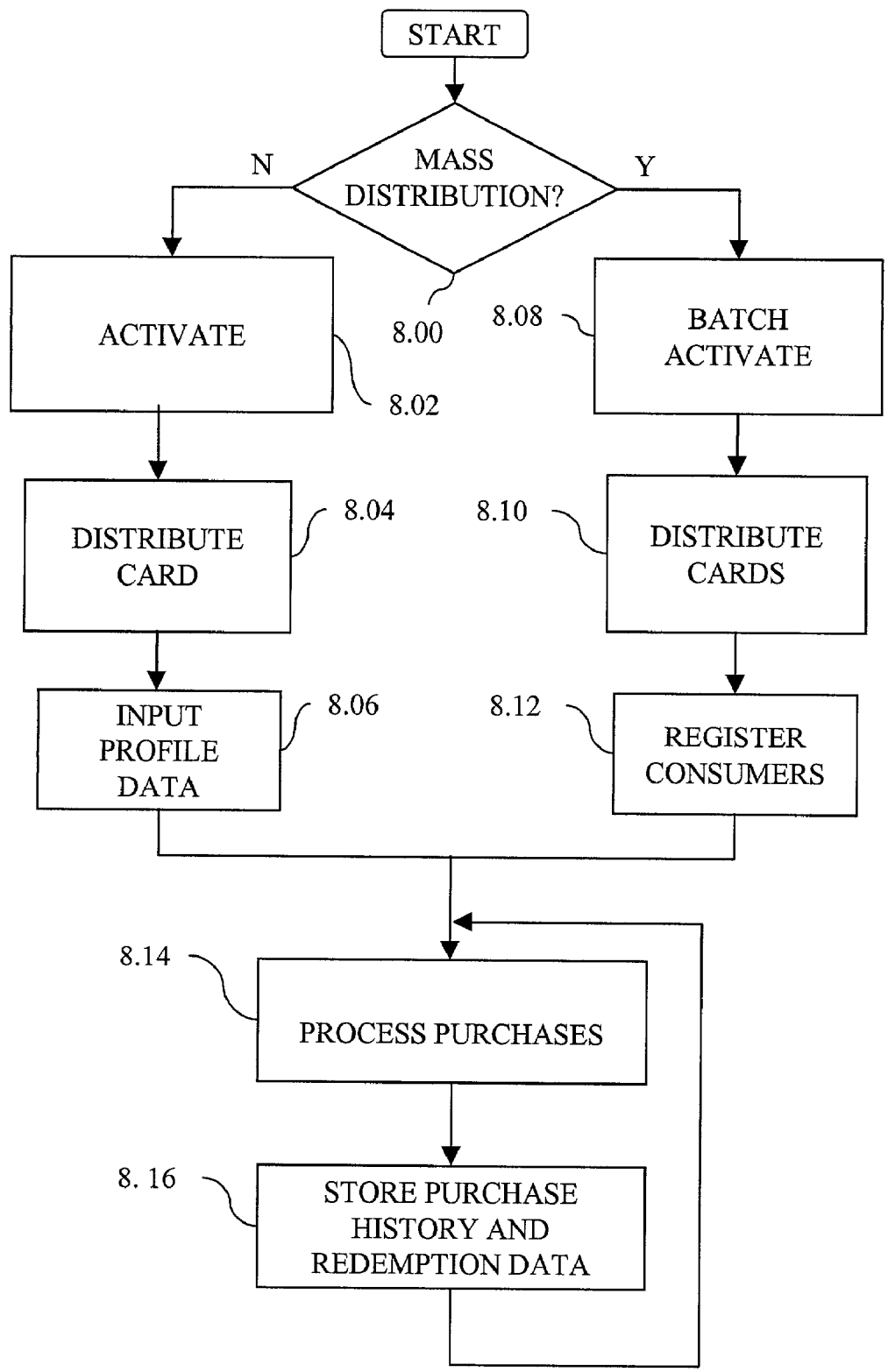
FIG. 7 is a flow chart illustrating some of the pertinent functions performed during individual and batch mode store card activation, subsequent consumer store card registration, and consumer record maintenance.

FIG. 7 shows steps involved in store card activation performed in either the individual or batch mode.

In step 8.00, the computer (central computer 30 or purchase control computer 20) determines whether a card activation request is for a single card or a plurality of cards. If a single card is to be activated, an individual store card is activated and associated with a credit value, as shown in block 8.02. The store card is distributed to a consumer, as shown by block 8.04. The consumer may optionally register their consumer profile data for association with the store card CID data, as shown in block 8.06.

In step 8.00, if a plurality of cards are to be activated, a batch of multiple store cards are activated and associated with a credit value, as shown by block 8.10. The batch of store cards are distributed to multiple consumers, as shown by block 8.10. Distribution may be by mass mailing, at a POS terminal in a retail store, at a service desk in the retail store, or via purchase of the card at a location in a different store. Consumers that receive a store card from a batch distribution may subsequently register the card by providing their personal information for storage in association with the CID of the card, as shown in step 8.12.

In step 8.14, items purchased by a consumer presenting a store card are processed in a purchase transaction. The consumer's purchases are stored along in association with the card's CID), and sponsored programs debits and credits, as shown in block 8.16.

Figure 8:
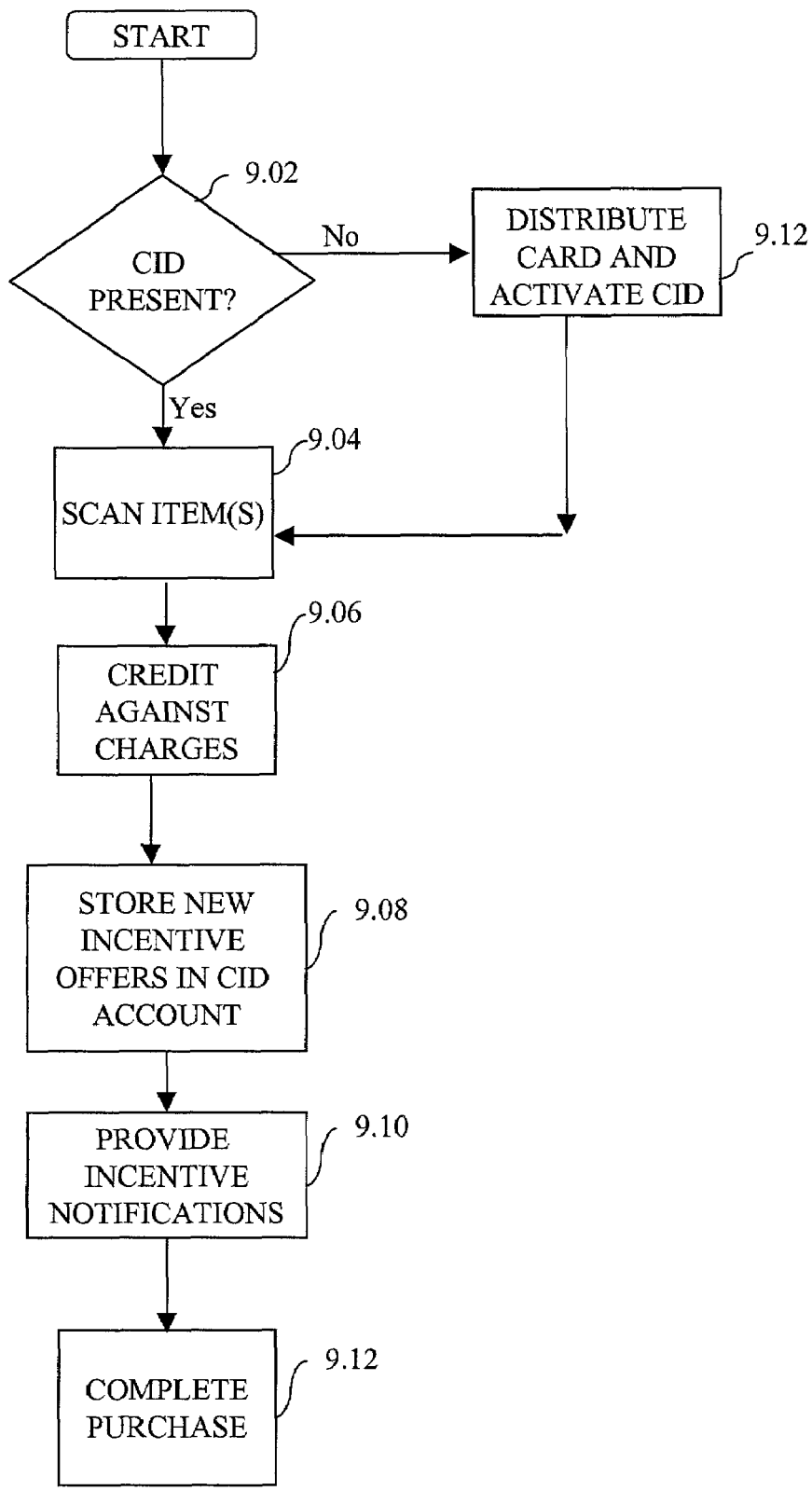
FIG. 8 is a flow chart illustrating POS terminal functions involving CIDs.

FIG. 8 shows details of a purchase transaction at a POS terminal involving a CID.

In step 9.02, during a purchase transaction, a determination is made whether a CID is associated with the transaction. For example, the POS system may read a CID from a scanned card. If no CID is identified, a consumer may be offered a card either by a sales clerk or via an automated visual or audible communication.

If the POS terminal 12 detects a CID, the purchase transaction proceeds with scanning of product items (step 9.04), crediting of unconditional credits in accounts associated with the CID, crediting of conditional purchase incentives for which conditions are satisfied (step 9.06), determination of new incentives to which the customer is to be offered and offering those purchase incentives to the customer (step 9.08 and 9.10), and completing the transaction via exchange of goods and currency and updating computer database accounts (step 9.12).

Furthermore, a manufacturer can determine criteria to reward its customers based upon the individual customer's purchase history. The manufacturer sponsor proceed by defining criteria to use to reward CID accounts and then transmitting that criteria to central computer 30. Central computer 30 can then apply that criteria against CID) records in global consumer purchase history database 32, generate reward data for CIDs that meet the criteria, and transmit data to each retailer for CIDs associated with that retailer indicating the manufacturer's reward or purchase incentive to provide to the customer presenting that CID in a POS terminal purchase transaction in the retailer's store.

An FSC-Script Program method of the present invention provides a computer implemented method for accounting for a sponsor organization's purchase of script cards from a retailer or manufacturer at a discounted value relative the card's account values. The retailers accrue script dollars (value) in general ledgers as certificate purchases. The retailers record changes in accounts when the Script Program cards are used in the retailers' stores in purchase transactions and at expiration dates associated with the Script Program offers. The consumers can subsequently use the card in the retailers's frequent shopper discount and incentive programs.

Obviously, numerous modifications and variations of the present invention are possible in light of the above teachings. Accordingly, the inventors do not intend to be limited by the specific embodiments of the invention disclosure above.

What is claimed:

1. A computer implemented method comprising the steps of:
   storing a CID on a card;
   activating, in a computer system of a third party, a consumer account associated with said card;
   providing, in said computer system of said third party, said consumer account with an initial credit;
   identifying, in a retail store computer system, said CID in a purchase transaction in a retail store associated with said retail store computer system;
   debiting, in said retail store computer system, said consumer account by the amount of said purchase transaction;
   determining, in said retail store computer system, conditions for future credits associated with said CID;
   storing, in said retail store computer system, said conditions in an account associated with said CID;
   crediting, in said retail store computer system, said consumer account, when said conditions are satisfied;
   selling said card by said third party to a consumer at a card sale price; and
   crediting, in said computer system of said third party, a retail store account of said retail store by an amount less than said initial credit when said computer system of said third party activates said account.

2. The method of claim 1 wherein said card is sold to a consumer as a gift card defigning a right to specified credit in a specified store.

3. The method of claim 1 wherein said card is one of a plurality of store cards batch activated and postal mailed to consumers' postal addresses.

4. The method of claim 1 further comprising storing product purchase history for products purchased in association with said CID.

5. The method of claim 1 wherein said conditions depend upon a product purchase history of said customer stored in association with said CID meeting criteria.

6. The method of claim 5 wherein said criteria are transmitted from a manufacturer to a central computer storing product purchase history data associated with CIDs from a plurality of retail stores and retail store companies.

7. The method of claim 1 wherein said card sale price is less than said initial credit.

8. The method of claim 1 further comprising, after said activating, transmitting from said computer system of said third party to said retail store computer system a signal indicating that said consumer account has been activated.

9. The method of claim 1 further comprising transferring funds totaling an amount that is less than said card sale price from said third party to said retail store.

10. A computer system, comprising computer readable medium storing instructions for performing the following functions:
   storing a CID on a card;
   activating, in a computer system of a third party, a consumer account associated with said card;
   providing, in said computer system of said third party, said consumer account with an initial credit;
   identifying, in a retail store computer system, said CID in a purchase transaction in a retail store associated with said retail store computer system;
   debiting, in said retail store computer system, said consumer account by the amount of said purchase transaction;
   determining, in said retail store computer system, conditions for future credits associated with said CID;
   storing, in said retail store computer system, said conditions in an account associated with said CID;
   crediting, in said retail store computer system, said consumer account, costs of items purchased when said conditions are satisfied;
   selling said card by said third party to a consumer at a card sale price; and
   crediting, in said computer system of said third party, a retail store account of said retail store by an amount less than said initial credit when said computer system of said third party activates said account.

11. The system of claim 10 wherein said card is a gift card defining a right to specified credit in a specified store.

12. The system of claim 10 wherein said card is one of a plurality of store cards batch activated, and means for addressing said cards to consumers' postal addresses.

13. The system of claim 10 further comprising means for storing product purchase history for products purchased in association with said CID.

14. The system of claim 10 wherein said conditions depend upon a product purchase history of said customer stored in association with said CID meeting criteria, said system further storing said criteria.

15. The system of claim 12 further comprising structure for transmitting said criteria from a manufacturer to a central computer, said central computer storing product purchase history data associated with CIDs from a plurality of retail stores and retail store companies.

16. The system of claim 10 wherein said card sale price is less than said initial credit.

17. The system of claim 10 further comprising structure for, after said activating, transmitting, from said computer system of said third party to said retail store computer system a signal indicating that said consumer account has been activated.

18. The system of claim 10 further comprising structure for transferring funds totaling an amount that is less than said card sale price from said third party to said retail store.

* * * * *